US012234828B2

(12) United States Patent
Kabasawa et al.

(10) Patent No.: US 12,234,828 B2
(45) Date of Patent: Feb. 25, 2025

(54) VACUUM PUMP AND VACUUM PUMP ROTOR BLADE

(71) Applicant: Edwards Japan Limited, Chiba (JP)

(72) Inventors: Takashi Kabasawa, Chiba (JP); Kengo Saegusa, Chiba (JP)

(73) Assignee: Edwards Japan Limited, Chiba (JP)

( * ) Notice: Subject to any disclaimer, the term of this patent is extended or adjusted under 35 U.S.C. 154(b) by 67 days.

(21) Appl. No.: 18/004,989

(22) PCT Filed: Jul. 30, 2021

(86) PCT No.: PCT/JP2021/028255
§ 371 (c)(1),
(2) Date: Jan. 10, 2023

(87) PCT Pub. No.: WO2022/030374
PCT Pub. Date: Feb. 10, 2022

(65) Prior Publication Data
US 2023/0250826 A1 Aug. 10, 2023

(30) Foreign Application Priority Data
Aug. 7, 2020 (JP) ................................ 2020-135415

(51) Int. Cl.
*F04D 19/04* (2006.01)
*F04D 27/00* (2006.01)
(Continued)

(52) U.S. Cl.
CPC ........... *F04D 19/042* (2013.01); *F04D 19/04* (2013.01); *F04D 19/044* (2013.01);
(Continued)

(58) Field of Classification Search
CPC ...... F04D 19/04; F04D 19/042; F04D 19/044; F04D 27/001; F04D 29/023; F04D 19/048; F04D 29/321; F04D 29/5853
See application file for complete search history.

(56) References Cited

U.S. PATENT DOCUMENTS 6,343,910 B1 * 2/2002 Kawasaki ............ F04D 19/044
415/199.5
10,190,597 B2 * 1/2019 Kabasawa ............ F04D 29/321
2018/0355888 A1 12/2018 Sakaguchi et al.

FOREIGN PATENT DOCUMENTS

JP H0259294 U 4/1990
JP 2003269367 A 9/2003
(Continued)

OTHER PUBLICATIONS

Japanese Notice of Reasons for Refusal dated Mar. 28, 2024 for corresponding Japanese application Serial No. 2020-135415, 3 pages.
(Continued)

*Primary Examiner* — Peter J Bertheaud
(74) *Attorney, Agent, or Firm* — Theodore M. Magee; Westman, Champlin & Koehler, P.A.

(57) ABSTRACT

A vacuum pump and a vacuum pump rotor blade that can effectively limit deposition of reaction products are provided. The vacuum pump includes a rotating shaft held rotationally, a drive mechanism for the rotating shaft, a first rotor blade made of a first material, a second rotor blade made of a second material having higher heat resistance than the first material, and disposed further toward a downstream side than the first rotor blade, and a casing enclosing the rotating shaft, the first rotor blade, and the second rotor blade. The second rotor blade is disposed, via a heat insulating portion, on the first rotor blade.

11 Claims, 8 Drawing Sheets

(51) Int. Cl.

| | |
|---|---|
| ***F04D 29/02*** | (2006.01) |
| ***F04D 29/32*** | (2006.01) |
| ***F04D 29/58*** | (2006.01) |

(52) U.S. Cl.

CPC ......... *F04D 19/048* (2013.01); *F04D 27/001* (2013.01); *F04D 29/023* (2013.01); *F04D 29/321* (2013.01); *F04D 29/5853* (2013.01); *F05C 2201/0412* (2013.01); *F05C 2201/0466* (2013.01); *F05C 2203/08* (2013.01); *F05C 2251/048* (2013.01)

(56) References Cited

FOREIGN PATENT DOCUMENTS

| | | | |
|---|---|---|---|
| JP | 2007071139 | A | 3/2007 |
| JP | 2009108752 | A | 5/2009 |
| JP | 4503947 | B2 | 7/2010 |
| JP | 2014-029129 | A | 2/2014 |
| JP | 2017106365 | A | 6/2017 |
| WO | 2008062597 | A1 | 5/2008 |
| WO | 2008062598 | A1 | 5/2008 |
| WO | 2020120955 | A1 | 6/2020 |

OTHER PUBLICATIONS

PCT International Search Report dated Sep. 7, 2021 for corresponding PCT application Serial No. PCT/JP2021/028255, 2 pages.

PCT International Written Opinion dated Sep. 7, 2021 for corresponding PCT application Serial No. PCT/JP2021/028255, 4 pages.

European Communication dated Jul. 10, 2024 and Supplementary European Search Report dated Jun. 25, 2024 for corresponding European application Serial No. 21853289.3, 9 pages.

* cited by examiner

VACUUM PUMP AND VACUUM PUMP ROTOR BLADE

CROSS-REFERENCE OF RELATED APPLICATION

This application is a Section 371 National Stage Application of International Application No. PCT/JP2021/028255, filed Jul. 30, 2021, which is incorporated by reference in its entirety and published as WO 2022/030374A1 on Feb. 10, 2022 and which claims priority of Japanese Application No. 2020-135415, filed Aug. 7, 2020.

BACKGROUND

The present invention relates to a vacuum pump and a vacuum pump rotor blade.

Apparatuses such as semiconductor manufacturing apparatuses, liquid crystal manufacturing apparatuses, electron microscopes, surface analysis apparatuses, and microfabrication apparatuses require internal environments of a high degree of vacuum. Hence, vacuum pumps are used to produce a high degree of vacuum in such apparatuses.

To prevent reaction products generated in semiconductor manufacturing or the like from being deposited in a vacuum pump, a technique has been devised that maintains a drag pump mechanism placed in a downstream section of the vacuum pump at higher than or equal to a sublimation temperature of the reaction products. However, depending on a semiconductor manufacturing process, the sublimation temperature of the reaction products may be so high that the deposition cannot be prevented. In this case, the drag pump mechanism needs to be periodically removed to be disassembled and cleaned, and this consumes time and cost for the work.

The discussion above is merely provided for general background information and is not intended to be used as an aid in determining the scope of the claimed subject matter. The claimed subject matter is not limited to implementations that solve any or all disadvantages noted in the background.

SUMMARY

Using a high heat resistant material downstream of a rotor blade seems to allow a downstream section of the vacuum pump to be maintained at a high temperature. However, in practice, a large amount of heat may flow from a high temperature portion on the downstream side to a low temperature portion on the upstream side, causing the low temperature portion to readily exceed a permissible temperature. This may cause a problem where the downstream section of the vacuum pump cannot be sufficiently heated, facilitating the deposition of reaction products.

To solve the above problem, it is an object of the present invention to provide a vacuum pump and a vacuum pump rotor blade that can effectively limit the deposition of reaction products.

A vacuum pump according to the present invention for achieving the above object includes: a rotating shaft held rotationally; a drive mechanism for the rotating shaft; a first rotor blade made of a first material; a second rotor blade made of a second material having higher heat resistance than the first material, and disposed further toward a downstream side than the first rotor blade; and a casing enclosing the rotating shaft, the first rotor blade, and the second rotor blade, wherein the second rotor blade is disposed, via a heat insulating portion, on at least one of the rotating shaft or the first rotor blade.

A vacuum pump rotor blade according to the present invention for achieving the above object includes: a first rotor blade made of a first material; and a second rotor blade that is made of a second material having higher heat resistance than the first material and is disposed downstream of the first rotor blade, wherein the second rotor blade is disposed, via a heat insulating portion, on the first rotor blade.

In the vacuum pump and the vacuum pump rotor blade configured as described above, the second rotor blade disposed downstream of the first rotor blade is disposed via the heat insulating portion. This reduces the flow of heat into the first rotor blade on the upstream side even when the second rotor blade on the downstream side is heated to a high temperature. This allows the downstream second rotor blade to have a high temperature while inhibiting the overheating of the upstream first rotor blade, thereby limiting the deposition of reaction products in the vacuum pump. The second rotor blade that is disposed on at least one of the rotating shaft or the first rotor blade via the heat insulating portion is not limited to a configuration in which the second rotor blade is directly disposed only via the heat insulating portion, and the second rotor blade may be disposed indirectly via the heat insulating portion and also a section or member other than the heat insulating portion.

The heat insulating portion may be made of a third material having lower thermal conductivity than the first material and the second material. This allows the heat insulating portion made of the third material to effectively inhibit the flow of heat into the first rotor blade from the second rotor blade.

The third material may be a porous material. This allows the heat insulating portion made of a porous material with low thermal conductivity to effectively inhibit the flow of heat into the first rotor blade from the second rotor blade.

The third material may be stainless steel or a titanium alloy. This allows the heat insulating portion made of stainless steel or a titanium alloy with low thermal conductivity to effectively inhibit the flow of heat into the first rotor blade from the second rotor blade.

The third material may be ceramic. This allows the heat insulating portion made of ceramic with low thermal conductivity to effectively inhibit the flow of heat into the first rotor blade from the second rotor blade.

The third material may be a resin material. This allows the heat insulating portion made of a resin material with low thermal conductivity to effectively inhibit the flow of heat into the first rotor blade from the second rotor blade.

The heat insulating portion may be a heat insulating structure having a predetermined length and thickness. This allows the heat insulating portion of the heat insulating structure having a predetermined length and thickness to effectively inhibit the flow of heat into the first rotor blade from the second rotor blade.

The first rotor blade may include blade rows of rotating blades in multiple stages disposed on a side surface of the first rotor blade. The vacuum pump may include blade rows of stationary blades disposed between the blade rows of the rotating blades. The blade rows of the rotating blades and the blade rows of the stationary blades may form a turbomolecular pump mechanism. This allows for effective exhaustion even with a low pressure.

The second rotor blade may include at least one rotating cylindrical portion disposed on the second rotor blade. The vacuum pump may further include at least one stationary cylindrical portion disposed facing an outer circumference surface or an inner circumference surface of the rotating cylindrical portion. The rotating cylindrical portion and the stationary cylindrical portion may form a Holweck type drag pump mechanism. This allows for effective exhaustion even when the pressure near the pump outlet port is relatively high.

The second rotor blade may include at least one rotating disc portion disposed on a side surface of the second rotor blade. The vacuum pump may include at least one stationary disc portion disposed facing a surface of the rotating disc portion that faces in an axial direction thereof. The rotating disc portion and the stationary disc portion may forma Siegbahn type drag pump mechanism. This allows for effective exhaustion even when the pressure near the pump outlet port is relatively high.

The first rotor blade may be configured such that at least a portion thereof projects to a downstream side beyond the heat insulating portion. This increases the surface area of the first rotor blade, facilitating the heat dissipation from the first rotor blade to a member facing the surface of the first rotor blade.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION

Figure 1:
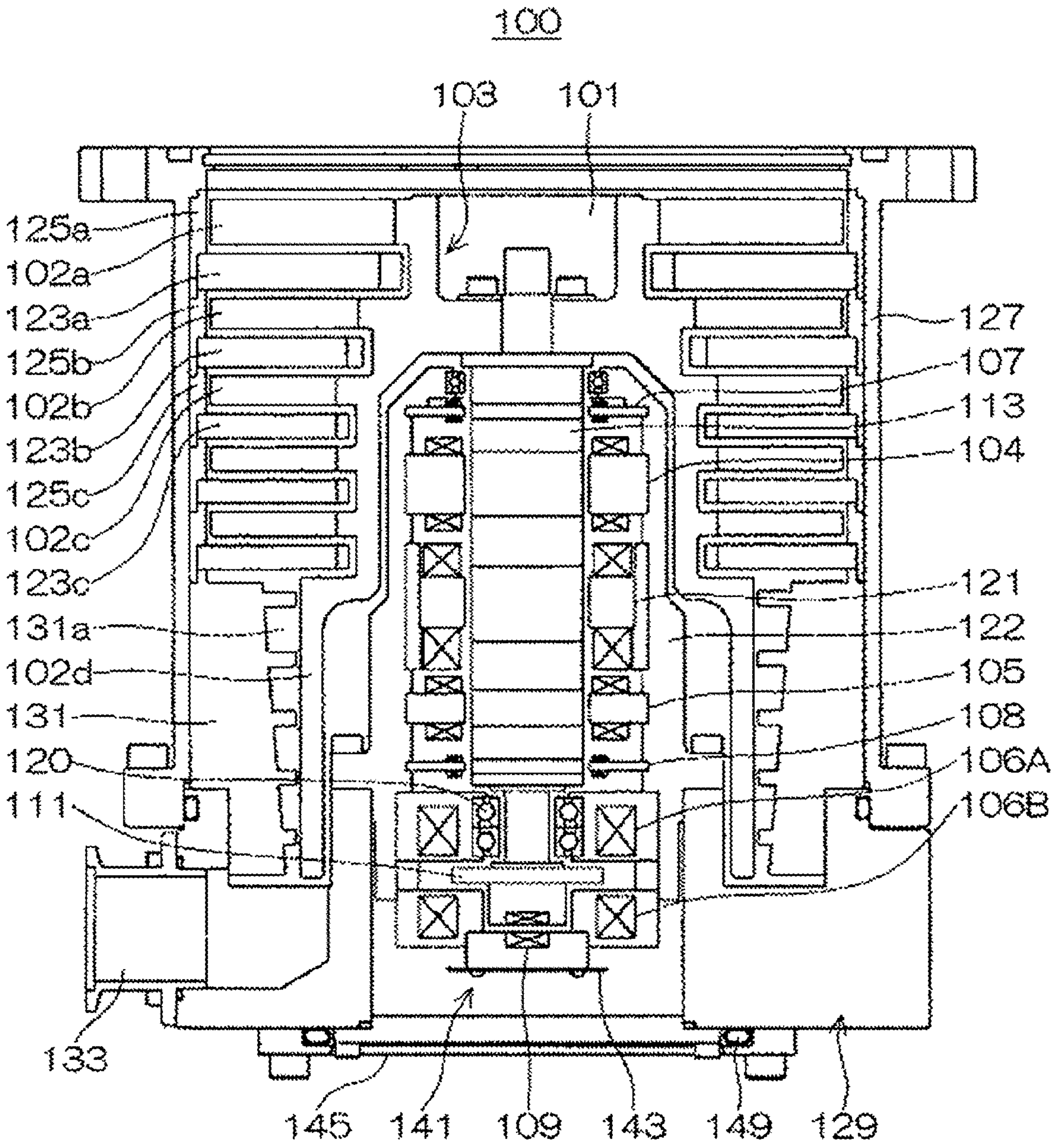
FIG. 1 is a vertical cross-sectional view of a vacuum pump.

Embodiments of the present invention are now described with reference to the drawings. The drawings are not necessarily to scale, and some dimensions may be exaggerated for convenience of explanation. In the description and the drawings, same reference numerals are given to components with substantially the same function and configuration, and the descriptions thereof are omitted.

First Embodiment

A vacuum pump according to a first embodiment of the present invention is a turbomolecular pump 100 that exhausts gas by hitting gas molecules with rotating blades of a rotating body, which rotates at high speed. The turbomolecular pump 100 may be used to draw in gas from a chamber of a semiconductor manufacturing apparatus, for example, and exhaust the gas.

FIG. 1 is a vertical cross-sectional view of the turbomolecular pump 100. As shown in FIG. 1, the turbomolecular pump 100 has a circular outer cylinder 127 having an inlet port 101 at its upper end. A rotating body 103 placed in the outer cylinder 127 includes a plurality of rotating blades 102 (102_a_, 102_b_, 102_c_, . . . ), which are turbine blades for gas suction and exhaustion, in its outer circumference section. The rotating blades 102 extend radially in multiple stages. The rotating body 103 has a rotating shaft 113 in its center. The rotating shaft 113 is levitated, supported, and position-controlled by a magnetic bearing of 5-axis control, for example.

Upper radial electromagnets 104 include four electromagnets arranged in pairs on an X-axis and a Y-axis. Four upper radial sensors 107 are provided in close proximity to the upper radial electromagnets 104 and associated with the respective upper radial electromagnets 104. Each upper radial sensor 107 may be an inductance sensor or an eddy current sensor having a conduction winding, for example, and detects the position of the rotating shaft 113 based on a change in the inductance of the conduction winding, which changes according to the position of the rotating shaft 113. The upper radial sensors 107 are configured to detect a radial displacement of the rotating shaft 113, that is, the rotating body 103 fixed to the rotating shaft 113, and send it to the controller (not illustrated).

In the controller, for example, a compensation circuit having a PID adjustment function generates an excitation control command signal for the upper radial electromagnets 104 based on a position signal detected by the upper radial sensors 107. Based on this excitation control command signal, an amplifier circuit 150 (described below) shown in FIG. 2 controls and excites the upper radial electromagnets 104 to adjust a radial position of an upper part of the rotating shaft 113.

The rotating shaft 113 may be made of a high magnetic permeability material (such as iron and stainless steel) and is configured to be attracted by magnetic forces of the upper radial electromagnets 104. The adjustment is performed independently in the X-axis direction and the Y-axis direction. Lower radial electromagnets 105 and lower radial sensors 108 are arranged in a similar manner as the upper radial electromagnets 104 and the upper radial sensors 107 to adjust the radial position of the lower part of the rotating shaft 113 in a similar manner as the radial position of the upper part.

Additionally, axial electromagnets 106A and 106B are arranged so as to vertically sandwich a metal disc 111, which has a shape of a circular disc and is provided in the lower part of the rotating 113. The metal disc 111 is made of a high magnetic permeability material such as iron. An axial sensor 109 is provided to detect an axial displacement of the rotating shaft 113 and send an axial position signal to the controller.

In the controller, the compensation circuit having the PID adjustment function may generate an excitation control command signal for each of the axial electromagnets 106A and 106B based on the signal on the axial position detected by the axial sensor 109. Based on these excitation control command signals, the amplifier circuit 150 controls and excites the axial electromagnets 106A and 106B separately so that the axial electromagnet 106A magnetically attracts the metal disc 111 upward and the axial electromagnet 106B attracts the metal disc 111 downward. The axial position of the rotating shaft 113 is thus adjusted.

As described above, the controller appropriately adjusts the magnetic forces exerted by the axial electromagnets 106A and 106B on the metal disc 111, magnetically levitates the rotating shaft 113 in the axial direction, and suspends the rotating shaft 113 in the air in a non-contact manner. The amplifier circuit 150, which controls and excites the upper radial electromagnets 104, the lower radial electromagnets 105, and the axial electromagnets 106A and 106B, is described below.

The motor 121 includes a plurality of magnetic poles circumferentially arranged to surround the rotating shaft 113. Each magnetic pole is controlled by the controller so as to drive and rotate the rotating shaft 113 via an electromagnetic force acting between the magnetic pole and the rotating shaft 113. The motor 121 also includes a rotational speed sensor (not shown), such as a Hall element, a resolver, or an encoder, and the rotational speed of the rotating shaft 113 is detected based on a detection signal of the rotational speed sensor.

Furthermore, a phase sensor (not shown) is attached adjacent to the lower radial sensors 108 to detect the phase of rotation of the rotating shaft 113. The controller detects the position of the magnetic poles using both detection signals of the phase sensor and the rotational speed sensor.

A plurality of stationary blades 123*a*, 123*b*, 123*c*, . . . are arranged slightly spaced apart from the rotating blades 102 (102*a*, 102*b*, 102*c*, . . . ). Each rotating blade 102 (102*a*, 102*b*, 102*c*, . . . ) is inclined by a predetermined angle from a plane perpendicular to the axis of the rotating shaft 113 in order to transfer exhaust gas molecules downward through collision.

The stationary blades 123 are also inclined by a predetermined angle from a plane perpendicular to the axis of the rotating shaft 113. The stationary blades 123 extend inward of the outer cylinder 127 and alternate with the stages of the rotating blades 102. The outer circumference ends of the stationary blades 123 are inserted between and thus supported by a plurality of layered stationary blade spacers 125 (125*a*, 125*b*, 125*c*, . . . ).

The stationary blade spacers 125 are ring-shaped members made of a metal, such as aluminum, iron, stainless steel, or copper, or an alloy containing these metals as components, for example. The outer cylinder 127 is fixed to the outer circumferences of the stationary blade spacers 125 with a slight gap. Abase portion 129 is located at the base of the outer cylinder 127. The base portion 129 has an outlet port 133 providing communication to the outside. The exhaust gas transferred to the base portion 129 through the inlet port 101 from the chamber is then sent to the outlet port 133.

According to the application of the turbomolecular pump 100, a threaded spacer 131 may be provided between the lower part of the stationary blade spacer 125 and the base portion 129. The threaded spacer 131 is a cylindrical member made of a metal such as aluminum, copper, stainless steel, or iron, or an alloy containing these metals as components. The threaded spacer 131 has a plurality of helical thread grooves 131*a* in its inner circumference surface. When exhaust gas molecules move in the rotation direction of the rotating body 103, these molecules are transferred toward the outlet port 133 in the direction of the helix of the thread grooves 131*a*. In the lowermost section of the rotating body 103 below the rotating blades 102 (102*a*, 102*b*, 102*c*, . . . ), a rotating cylindrical portion 102*d* extends downward. The outer circumference surface of the rotating cylindrical portion 102*d* is cylindrical and projects toward the inner circumference surface of the threaded spacer 131. The outer circumference surface is adjacent to but separated from the inner circumference surface of the threaded spacer 131 by a predetermined gap. The exhaust gas transferred to the thread grooves 131*a* by the rotating blades 102 and the stationary blades 123 is guided by the thread grooves 131*a* to the base portion 129.

The base portion 129 is a disc-shaped member forming the base section of the turbomolecular pump 100, and is generally made of a metal such as iron, aluminum, or stainless steel. The base portion 129 physically holds the turbomolecular pump 100 and also serves as a heat conduction path. As such, the base portion 129 is preferably made of rigid metal with high thermal conductivity, such as iron, aluminum, or copper.

In this configuration, when the motor 121 drives and rotates the rotating blades 102 together with the rotating shaft 113, the interaction between the rotating blades 102 and the stationary blades 123 causes the suction of exhaust gas from the chamber through the inlet port 101. The exhaust gas taken through the inlet port 101 moves between the rotating blades 102 and the stationary blades 123 and is transferred to the base portion 129. At this time, factors such as the friction heat generated when the exhaust gas comes into contact with the rotating blades 102 and the conduction of heat generated by the motor 121 increase the temperature of the rotating blades 102. This heat is conducted to the stationary blades 123 through radiation or conduction via gas molecules of the exhaust gas, for example.

The stationary blade spacers 125 are joined to each other at the outer circumference portion and conduct the heat received by the stationary blades 123 from the rotating blades 102, the friction heat generated when the exhaust gas comes into contact with the stationary blades 123, and the like to the outside.

In the above description, the threaded spacer 131 is provided at the outer circumference of the rotating cylindrical portion 102*d* of the rotating body 103, and the thread grooves 131*a* are engraved in the inner circumference surface of the threaded spacer 131. However, this may be inversed in some cases, and a thread groove may be engraved in the outer circumference surface of the rotating cylindrical portion 102*d*, while a spacer having a cylindrical inner circumference surface may be arranged around the outer circumference surface.

According to the application of the turbomolecular pump 100, to prevent the gas drawn through the inlet port 101 from entering an electrical portion, which includes the upper radial electromagnets 104, the upper radial sensors 107, the motor 121, the lower radial electromagnets 105, the lower radial sensors 108, the axial electromagnets 106A, 106B, and the axial sensor 109, the electrical portion may be surrounded by a stator column 122. The inside of the stator column 122 may be maintained at a predetermined pressure by purge gas.

In this case, the base portion 129 has a pipe (not shown) through which the purge gas is introduced. The introduced purge gas is sent to the outlet port 133 through gaps between a protective bearing 120 and the rotating shaft 113, between the rotor and the stator of the motor 121, and between the stator column 122 and the inner circumference cylindrical portion of the rotating blade 102.

The turbomolecular pump 100 requires the identification of the model and control based on individually adjusted unique parameters (for example, various characteristics associated with the model). To store these control parameters, the turbomolecular pump 100 includes an electronic circuit portion 141 in its main body. The electronic circuit portion 141 may include a semiconductor memory, such as an EEPROM, electronic components such as semiconductor elements for accessing the semiconductor memory, and a substrate 143 for mounting these components. The electronic circuit portion 141 is housed under a rotational speed sensor (not shown) near the center, for example, of the base portion 129, which forms the lower part of the turbomolecular pump 100, and is closed by an airtight bottom lid 145.

Some process gas introduced into the chamber in the manufacturing process of semiconductors has the property of becoming solid when its pressure becomes higher than a predetermined value or its temperature becomes lower than a predetermined value. In the turbomolecular pump 100A, the pressure of the exhaust gas is lowest at the inlet port 101 and highest at the outlet port 133. When the pressure of the process gas increases beyond a predetermined value or its temperature decreases below a predetermined value while the process gas is being transferred from the inlet port 101 to the outlet port 133, the process gas is solidified and adheres and accumulates on the inner side of the turbomolecular pump 100.

For example, when SiCl4 is used as the process gas in an Al etching apparatus, according to the vapor pressure curve, a solid product (for example, AlCl3) is deposited at a low vacuum (760 [torr] to 10-2 [torr]) and a low temperature (about 20 [° C.]) and adheres and accumulates on the inner side of the turbomolecular pump 100. When the deposit of the process gas accumulates in the turbomolecular pump 100, the accumulation may narrow the pump flow passage and degrade the performance of the turbomolecular pump 100. The above-mentioned product tends to solidify and adhere in areas with higher pressures, such as the vicinity of the outlet port and the vicinity of the threaded spacer 131.

To solve this problem, conventionally, a heater or annular water-cooled tube 149 (not shown) is wound around the outer circumference of the base portion 129, and a temperature sensor (e.g., a thermistor, not shown) is embedded in the base portion 129, for example. The signal of this temperature sensor is used to perform control to maintain the temperature of the base portion 129 at a constant high temperature (preset temperature) by heating with the heater or cooling with the water-cooled tube 149 (hereinafter referred to as TMS (temperature management system)).

Figure 2:
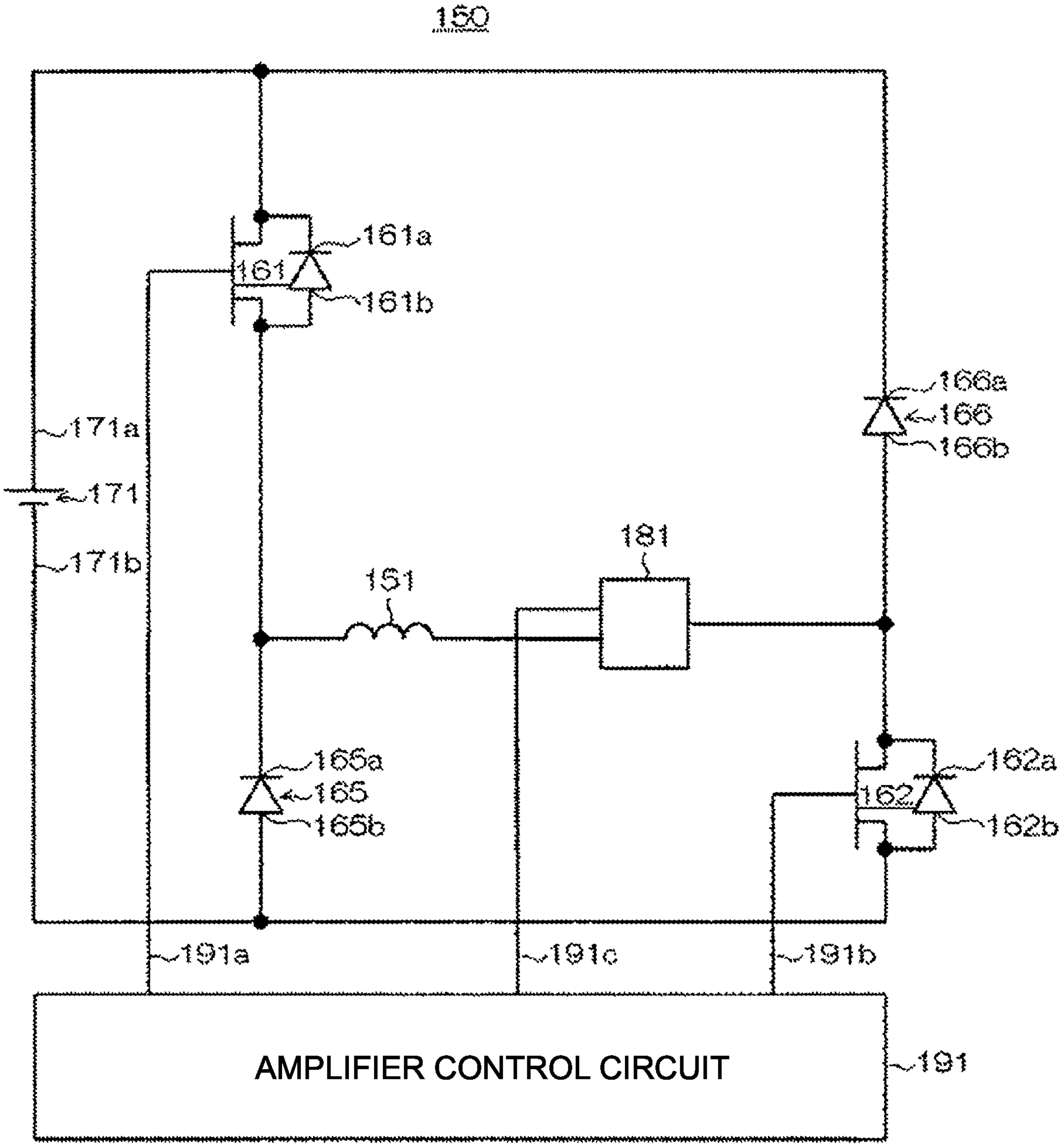
FIG. 2 is a circuit diagram of an amplifier circuit.

The amplifier circuit 150 is now described that controls and excites the upper radial electromagnets 104, the lower radial electromagnets 105, and the axial electromagnets 106A and 106B of the turbomolecular pump 100 configured as described above. FIG. 2 is a circuit diagram of the amplifier circuit 150.

Figure 3:
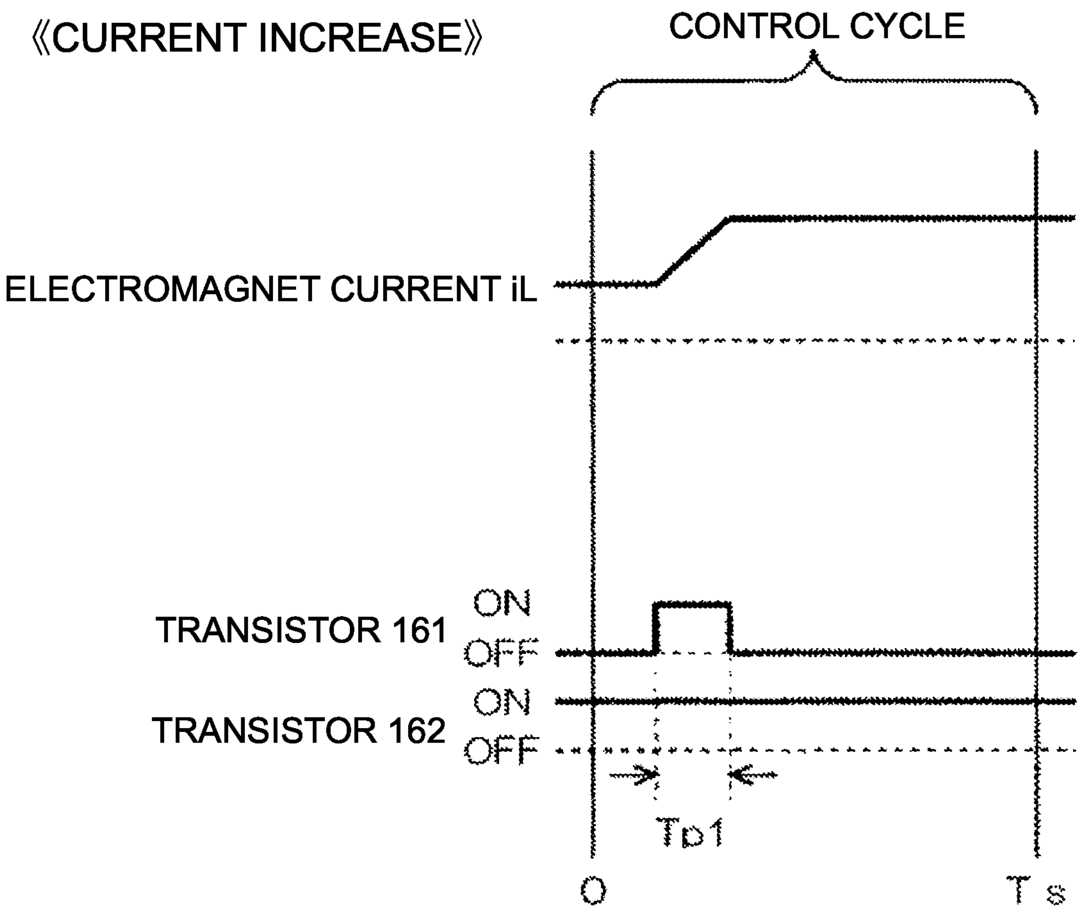
FIG. 3 is a time chart showing control performed when a current command value is greater than a detected value.

In FIG. 3, one end of an electromagnet winding 151 forming an upper radial electromagnet 104 or the like is connected to a positive electrode 171*a* of a power supply 171 via a transistor 161, and the other end is connected to a negative electrode 171*b* of the power supply 171 via a current detection circuit 181 and a transistor 162. Each transistor 161, 162 is a power MOSFET and has a structure in which a diode is connected between the source and the drain thereof.

In the transistor 161, a cathode terminal 161*a* of its diode is connected to the positive electrode 171*a*, and an anode terminal 161*b* is connected to one end of the electromagnet winding 151. In the transistor 162, a cathode terminal 162*a* of its diode is connected to a current detection circuit 181, and an anode terminal 162*b* is connected to the negative electrode 171*b*.

A diode 165 for current regeneration has a cathode terminal 165*a* connected to one end of the electromagnet winding 151 and an anode terminal 165*b* connected to the negative electrode 171*b*. Similarly, a diode 166 for current regeneration has a cathode terminal 166*a* connected to the positive electrode 171*a* and an anode terminal 166*b* connected to the other end of the electromagnet winding 151 via the current detection circuit 181. The current detection circuit 181 may include a Hall current sensor or an electric resistance element, for example.

The amplifier circuit 150 configured as described above corresponds to one electromagnet. Accordingly, when the magnetic bearing uses 5-axis control and has ten electromagnets 104, 105, 106A, and 106B in total, an identical amplifier circuit 150 is configured for each of the electromagnets. These ten amplifier circuits 150 are connected to the power supply 171 in parallel.

An amplifier control circuit 191 may be formed by a digital signal processor portion (not shown, hereinafter referred to as a DSP portion) of the controller. The amplifier control circuit 191 switches the transistors 161 and 162 between on and off.

The amplifier control circuit 191 is configured to compare a current value detected by the current detection circuit 181 (a signal reflecting this current value is referred to as a current detection signal 191*c*) with a predetermined current command value. The result of this comparison is used to determine the magnitude of the pulse width (pulse width time Tp1, Tp2) generated in a control cycle Ts, which is one cycle in PWM control. As a result, gate drive signals 191*a* and 191*b* having this pulse width are output from the amplifier control circuit 191 to gate terminals of the transistors 161 and 162.

Under certain circumstances such as when the rotational speed of the rotating body 103 reaches a resonance point during acceleration, or when a disturbance occurs during a constant speed operation, the rotating body 103 may require positional control at high speed and with a strong force. For this purpose, a high voltage of about 50 V, for example, is used for the power supply 171 to enable a rapid increase (or decrease) in the current flowing through the electromagnet winding 151. Additionally, a capacitor is generally connected between the positive electrode 171*a* and the negative electrode 171*b* of the power supply 171 to stabilize the power supply 171 (not shown).

In this configuration, when both transistors 161 and 162 are turned on, the current flowing through the electromagnet winding 151 (hereinafter referred to as an electromagnet current iL) increases, and when both are turned off, the electromagnet current iL decreases.

Also, when one of the transistors 161 and 162 is turned on and the other is turned off, a freewheeling current is maintained. Passing the freewheeling current through the amplifier circuit 150 in this manner reduces the hysteresis loss in the amplifier circuit 150, thereby limiting the power consumption of the entire circuit to a low level. Moreover, by controlling the transistors 161 and 162 as described above, high frequency noise, such as harmonics, generated in the turbomolecular pump 100 can be reduced. Furthermore, by measuring this freewheeling current with the current detection circuit 181, the electromagnet current iL flowing through the electromagnet winding 151 can be detected.

That is, when the detected current value is smaller than the current command value, as shown in FIG. 3, the transistors 161 and 162 are simultaneously on only once in the control cycle Ts (for example, 100 μs) for the time corresponding to the pulse width time Tp1. During this time, the electromagnet current iL increases accordingly toward the current value iLmax (not shown) that can be passed from the positive electrode 171*a* to the negative electrode 171*b* via the transistors 161 and 162.

Figure 4:
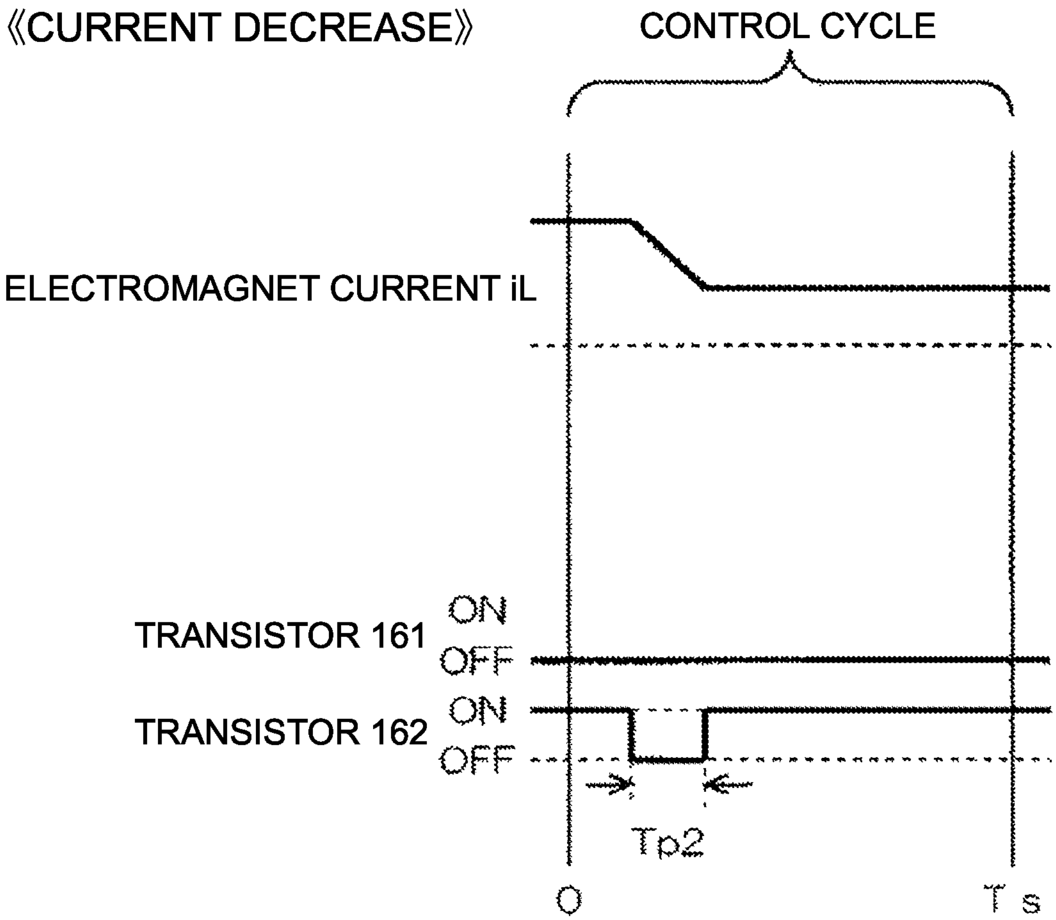
FIG. 4 is a time chart showing control performed when a current command value is less than a detected value.

When the detected current value is larger than the current command value, as shown in FIG. 4, the transistors 161 and 162 are simultaneously off only once in the control cycle Ts for the time corresponding to the pulse width time Tp2. During this time, the electromagnet current iL decreases accordingly toward the current value iLmin (not shown) that can be regenerated from the negative electrode 171*b* to the positive electrode 171*a* via the diodes 165 and 166.

In either case, after the pulse width time Tp1, Tp2 has elapsed, one of the transistors 161 and 162 is on. During this period, the freewheeling current is thus maintained in the amplifier circuit 150.

Figure 5:
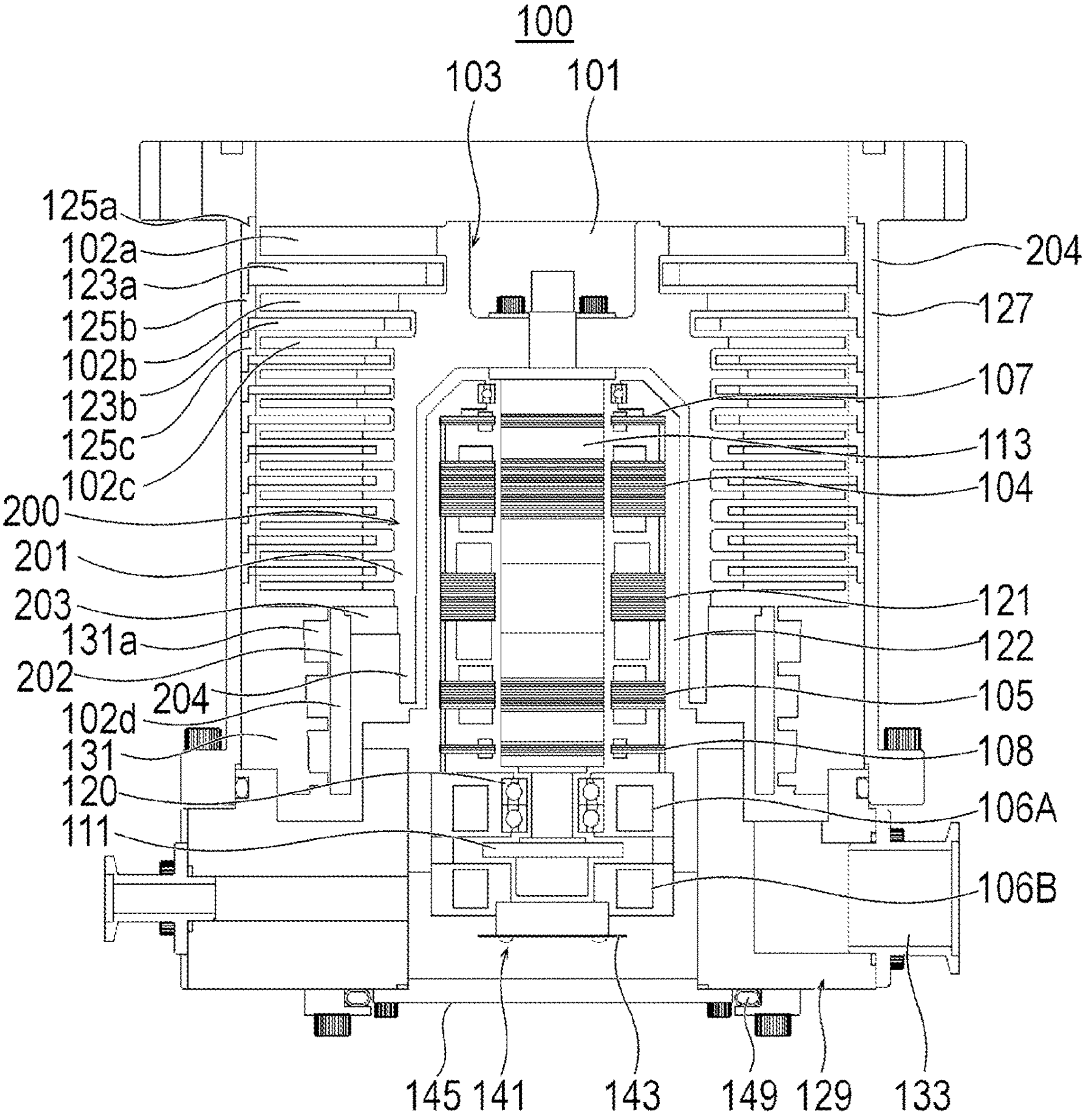
FIG. 5 is a vertical cross-sectional view of a vacuum pump according to a first embodiment.

As shown in FIG. 5, the vacuum pump according to the first embodiment is a vacuum pump rotor blade 200 including a first rotor blade 201, which includes a plurality of rotating blades 102 (102*a*, 102*b*, 102*c*, . . . ) on the rotating body 103, a second rotor blade 202, which includes a rotating cylindrical portion 102*d*, and a heat insulating portion 203, which is disposed between the first rotor blade 201 and the second rotor blade 202.

The heat insulating portion 203 is a member that inhibits the flow of heat into the first rotor blade 201 from the second rotor blade 202, which may be heated to a high temperature. The heat insulating portion 203 is a ring-shaped or cylindrical spacer. The inner circumference surface of the heat insulating portion 203 is coupled to the outer circumference surface of a downstream section of the first rotor blade 201, and the outer circumference surface of the heat insulating portion 203 is coupled to the inner circumference surface of an upstream section of the second rotor blade 202. The heat insulating portion 203 is coupled to the outer circumference surface of a section of the first rotor blade 201 that is downstream of the rotating blade 102 at the most downstream position. Since the heat insulating portion 203 is provided, the second rotor blade 202 is indirectly coupled to the first rotor blade 201 via the heat insulating portion 203, instead of being directly coupled to the first rotor blade 201. As long as the first rotor blade 201 is not directly coupled to the second rotor blade 202, there is no limitation to the section where the first rotor blade 201 is coupled to the heat insulating portion 203, or the section where the second rotor blade 202 is coupled to the heat insulating portion 203.

The first rotor blade 201 has a cylindrical projection 204 projecting to the downstream side from the section coupled to the heat insulating portion 203. The inner circumference surface of the first rotor blade 201 including the projection 204 faces the outer circumference surface of the stator column 122. This allows the projection 204 to exchange heat with the stator column 122 to dissipate heat to the stator column 122.

The second rotor blade 202 is cylindrical and has the rotating cylindrical portion 102*d*. The inner circumference surface of an upstream section of the second rotor blade 202 is coupled to the outer circumference surface of the heat insulating portion 203.

There is no limitation to the first material forming the first rotor blade 201, but the first material is preferably relatively lightweight to improve the rotational performance of the vacuum pump. For example, an aluminum alloy may be used. There is no limitation to the second material forming the second rotor blade 202, but the second material preferably has high heat resistance. For example, stainless steel may be used. The first material is lighter than the second material, and the second material has higher heat resistance than the first material.

The third material forming the heat insulating portion 203 is a low thermal conductivity material having lower thermal conductivity than the first material and the second material. Thus, the heat insulating portion 203 inhibits the flow of heat into the first rotor blade 201, which is a low temperature portion that is located on the upstream side and does not become as hot as a high temperature portion, from the second rotor blade 202, which is a high temperature portion located on the downstream side. Although not limited thereto, examples of the third material include ceramic such as zirconium dioxide, a resin material such as polyamide-imide, and a porous material having many fine pores. The porous material may be made of a metal material such as stainless steel or a titanium alloy, ceramic, a resin material, or the like. There is no limitation to the manufacturing method of the porous material. For example, the porous material may be formed by laminating materials using a 3D printer, or by sintering powder.

The outer cylinder 127 and the base portion 129 forma casing 204. The casing 204 rotatably encloses the rotating shaft 113, the first rotor blade 201, and the second rotor blade 202.

The operation of the above-mentioned vacuum pump is now described. When the rotating shaft 113 of the vacuum pump is driven by the motor 121, which is a drive mechanism, the rotating body 103 rotates. Accordingly, the action of the rotating blades 102 and the stationary blades 123 causes the suction of exhaust gas from the chamber through the inlet port 101.

The turbomolecular pump mechanism, which is formed by the rotating blades 102 of the first rotor blade 201 and the stationary blades 123, transfers the exhaust gas drawn through the inlet port 101 to the downstream side. The exhaust gas transferred to the downstream side is guided to the Holweck type drag pump mechanism, which is formed by the rotating cylindrical portion 102*d* of the second rotor blade 202 and the threaded spacer 131 serving as a stationary cylindrical portion, and then transferred to the outlet port 133. In this embodiment, the threaded spacer 131 is located at the outer circumference of the second rotor blade 202, and the thread grooves 131*a* are formed in the inner circumference surface of the threaded spacer 131. However, conversely, thread grooves may be formed in the outer circumference surface of the second rotor blade 202, and a spacer having a cylindrical inner circumference surface may be arranged around the second rotor blade 202.

As described above, the vacuum pump according to the first embodiment includes the rotating shaft 113, which is held rotationally, the drive mechanism (motor 121) for the rotating shaft 113, the first rotor blade 201 made of a first material, the second rotor blade 202, which is made of a second material having higher heat resistance than the first material and is disposed downstream of the first rotor blade 201, and the casing 204 enclosing the rotating shaft 113, the first rotor blade 201, and the second rotor blade 202. The second rotor blade 202 is disposed on the first rotor blade 201 via the heat insulating portion 203.

A vacuum pump rotor blade 200 includes the first rotor blade 201, which is made of the first material, and the second rotor blade 202, which is made of the second material having higher heat resistance than the first material and is disposed downstream of the first rotor blade 201. The second rotor blade 202 is disposed on the first rotor blade 201 via the heat insulating portion 203.

In the vacuum pump and the vacuum pump rotor blade 200 configured as described above, the second rotor blade 202 on the downstream side of the first rotor blade 201 is disposed via the heat insulating portion 203. This reduces the flow of heat into the first rotor blade 201 on the upstream side even when the second rotor blade 202 on the upstream side is heated to a high temperature. This allows the downstream second rotor blade 202 to be maintained at a high temperature while inhibiting the overheating of the upstream first rotor blade 201, thereby limiting the deposition of reaction products in the vacuum pump. As a result, the disassembly and cleaning of the vacuum pump become unnecessary, or the frequency of disassembly and cleaning can be reduced, thereby reducing working time and working cost. In addition, since the overheating of the upstream section is inhibited, it is not necessary to limit the flow rate of the gas being continuously exhausted, allowing the gas flow rate to be appropriately maintained.

The second rotor blade 202 that is disposed via the heat insulating portion 203 with respect to the first rotor blade 201 is not limited to a configuration in which the second rotor blade 202 is directly disposed only via the heat insulating portion 203, and the second rotor blade 202 may be disposed indirectly via the heat insulating portion 203 and a section or member other than the heat insulating portion 203.

The heat insulating portion 203 may be made of a third material having lower thermal conductivity than the first material and the second material. This allows the heat insulating portion 203 made of the third material to effectively inhibit the flow of heat into the first rotor blade 201 from the second rotor blade 202.

Also, the third material may be a porous material. This allows the heat insulating portion 203 made of a porous material with low thermal conductivity to effectively inhibit the flow of heat into the first rotor blade 201 from the second rotor blade 202.

Furthermore, the third material may be stainless steel or a titanium alloy. This allows the heat insulating portion 203 made of stainless steel or a titanium alloy with low thermal conductivity to effectively inhibit the flow of heat into the first rotor blade 201 from the second rotor blade 202.

The third material may also be ceramic. This allows the heat insulating portion 203 made of ceramic with low thermal conductivity to effectively inhibit the flow of heat into the first rotor blade 201 from the second rotor blade 202.

The third material may also be a resin material. This allows the heat insulating portion 203 made of a resin material with low thermal conductivity to effectively inhibit the flow of heat into the first rotor blade 201 from the second rotor blade 202.

The first rotor blade 201 includes blade rows of the rotating blades 102 in multiple stages disposed on the side surface of the first rotor blade 201. The vacuum pump includes blade rows of the stationary blades 123 disposed between the blade rows of the rotating blades 102. The blade rows of the rotating blades 102 and the blade rows of the stationary blades 123 form a turbomolecular pump mechanism. This allows for effective exhaustion even with a low pressure. Additionally, the heat insulating portion 203 effectively inhibits the flow of heat into the turbomolecular pump mechanism including the first rotor blade 201.

The second rotor blade 202 includes at least one rotating cylindrical portion 102*d* disposed on the second rotor blade 202. The vacuum pump includes at least one stationary cylindrical portion (the threaded spacer 131) disposed facing the outer circumference surface of the rotating cylindrical portion 102*d*. The rotating cylindrical portion 102*d* and the stationary cylindrical portion forma Holweck type drag pump mechanism. This allows for effective exhaustion even when the pressure near the pump outlet port 133 is relatively high. In addition, the heat insulating portion 203 inhibits the flow of heat into the first rotor blade 201 from the second rotor blade 202, allowing the Holweck type drag pump mechanism including the second rotor blade 202 to be maintained at a high temperature. This effectively limits the deposition of reaction products in the drag pump mechanism.

The first rotor blade 201 is configured such that at least a part thereof projects to the downstream side beyond the heat insulating portion 203. This increases the surface area (the area of the inner circumference surface) of the first rotor blade 201, facilitating the heat dissipation to the member located inward of the first rotor blade 201 (the stator column 122) from the first rotor blade 201.

Second Embodiment

Figure 6:
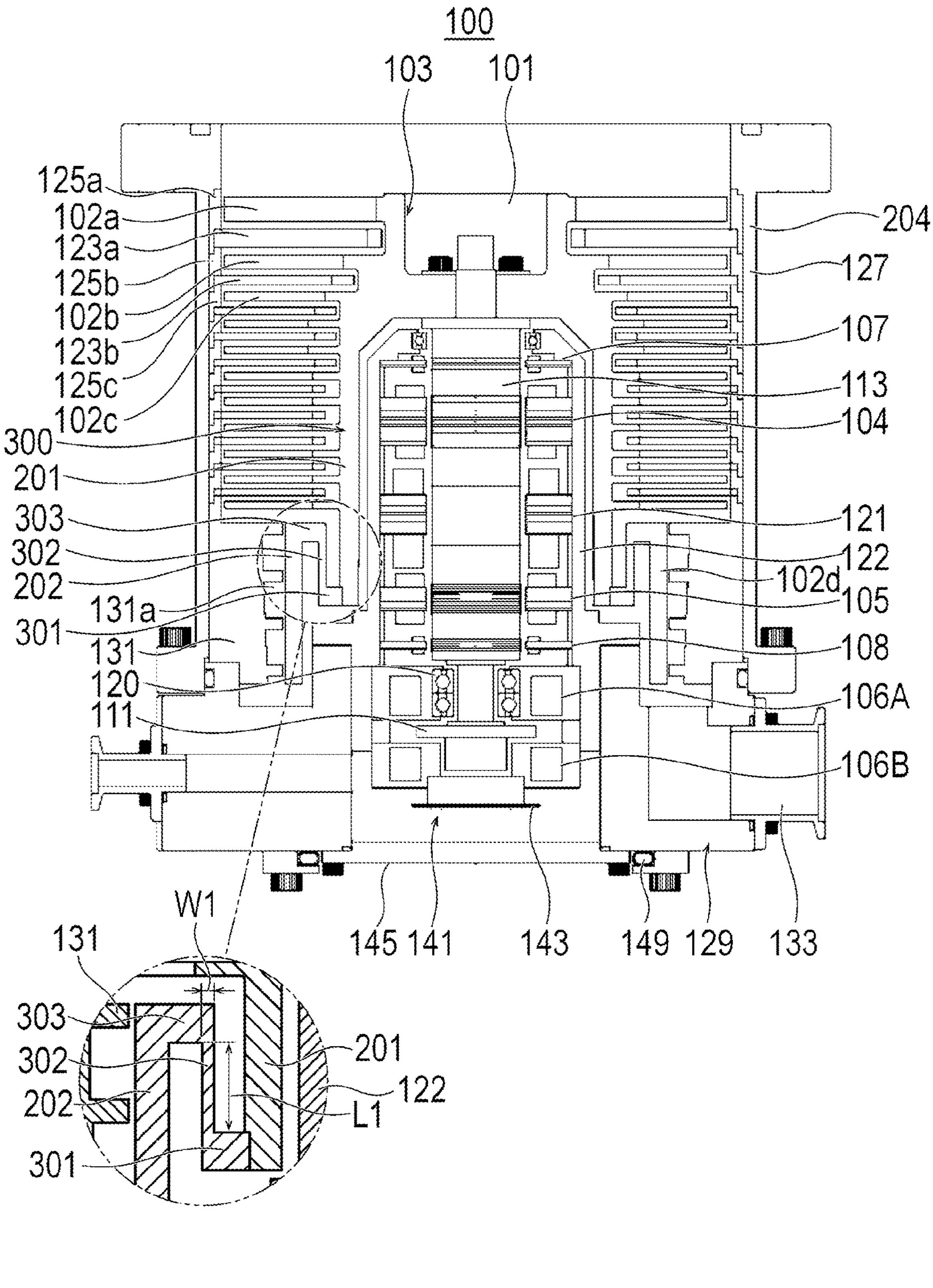
FIG. 6 is a vertical cross-sectional view of a vacuum pump according to a second embodiment.

As shown in FIG. 6, a vacuum pump according to a second embodiment differs from that of the first embodiment in the structure of a heat insulating portion 302.

A vacuum pump rotor blade 300 of a vacuum pump according to the second embodiment includes a first rotor blade 201, a ring-shaped first coupling portion 301, which is coupled to the downstream end of the first rotor blade 201, a cylindrical heat insulating portion 302, which extends from the first coupling portion 301 to the upstream side, a ring-shaped second coupling portion 303, which is coupled to the upstream end of the heat insulating portion 302, and a cylindrical second rotor blade 202, which extends from the second coupling portion 303 to the downstream side. The first coupling portion 301, the heat insulating portion 302, the second coupling portion 303, and the second rotor blade 202 are integrally made of the same material (for example, stainless steel).

The first coupling portion 301 couples the downstream end of the first rotor blade 201 to the downstream end of the heat insulating portion 302. The first coupling portion 301 projects radially outward from the outer circumference surface of the downstream end of the first rotor blade 201.

The second coupling portion 303 couples the upstream end of the second rotor blade 202 to the upstream end of the heat insulating portion 302. The second coupling portion 303 projects radially inward from the inner circumference surface of the upstream end of the second rotor blade 202.

The heat insulating portion 302 is provided between the outer circumference surface of the first rotor blade 201 and the inner circumference surface of the second rotor blade 202, and spaced apart from the outer circumference surface of the first rotor blade 201 and the inner circumference surface of the second rotor blade 202. The heat insulating portion 302 is a heat insulating structure having a predetermined thickness W1 in a radial direction and a predetermined length L1 in an axial direction. The axial direction is a direction along the central axis of rotation of the rotating body 103. The radial direction is a direction toward or away from the central axis of rotation of the rotating body 103 along a cross section perpendicular to the central axis. There is no limitation to the thickness W1, but it is preferably 1 to 10 mm, more preferably 2 to 5 mm, for example 3 mm. There is no limitation to the length L1, but it is preferably 10 to 50 mm, more preferably 20 to 40 mm, for example 30 mm. A smaller thickness W1 and a longer length L1 reduce the heat transfer amount of the heat insulating portion 302, reducing the flow of heat into the first rotor blade 201 from the second rotor blade 202. For example, the thickness W1 is smaller than the radial thickness of the section of the first rotor blade 201 located downstream of the rotating blade 102 at the most downstream position, and is also smaller than the radial thickness of an upstream section of the second rotor blade 202. This reduces the heat transfer amount of the heat insulating portion 302, thereby reducing the flow of heat into the first rotor blade 201 from the second rotor blade 202.

As described above, the heat insulating portion 302 of the vacuum pump according to the second embodiment is a heat insulating structure having the predetermined length L1 and the thickness W1. This allows the heat insulating portion 302 of the heat insulating structure having the predetermined length L1 and the thickness W1 to effectively inhibit the flow of heat into the first rotor blade 201 from the second rotor blade 202.

The first coupling portion 301 is located downstream of the second coupling portion 303, allowing the first rotor blade 201 to be longer in the axial direction. The section of the first rotor blade 201 facing the stator column 122 can thus have a large area, facilitating the heat dissipation from the first rotor blade 201 to the stator column 122.

Third Embodiment

Figure 7:
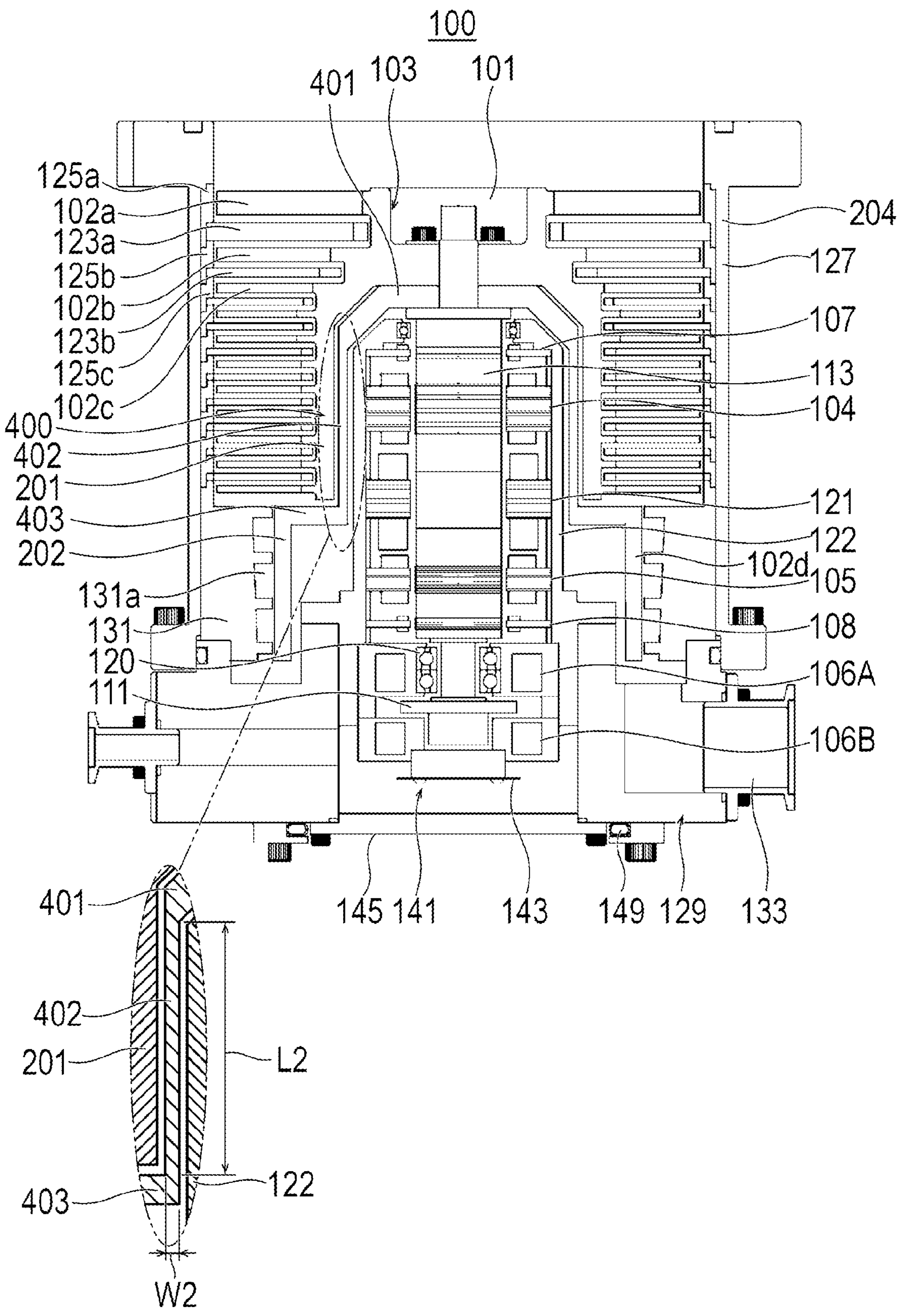
FIG. 7 is a vertical cross-sectional view of a vacuum pump according to a third embodiment.

As shown in FIG. 7, a vacuum pump according to a third embodiment differs from that of the first and second embodiments in that the second rotor blade 202 is disposed on both the rotating shaft 113 and the first rotor blade 201 via a heat insulating portion 402.

A vacuum pump rotor blade 400 of the vacuum pump according to the third embodiment includes the first rotor blade 201, a substantially ring-shaped first coupling portion 401, which is coupled to upstream sections of the rotating shaft 113 and the first rotor blade 201, a cylindrical heat insulating portion 402 extending from the first coupling portion 401 to the downstream side, a ring-shaped second coupling portion 403, which is coupled to the downstream end of the heat insulating portion 402, and a cylindrical second rotor blade 202 extending from the second coupling portion 403 to the downstream side. The first coupling portion 401, the heat insulating portion 402, the second coupling portion 403, and the second rotor blade 202 are integrally made of the same material (for example, stainless steel).

The first coupling portion 401 is coupled to the outer circumference surface of the rotating shaft 113 and is coupled to and sandwiched between the rotating shaft 113 and the first rotor blade 201 in the axial direction. The first coupling portion 401 extends radially outward from the outer circumference surface of the rotating shaft 113 and then extends to the downstream side.

The second coupling portion 403 couples the upstream end of the second rotor blade 202 to the downstream end of the heat insulating portion 402. The second coupling portion 403 projects radially inward from the inner circumference surface of the upstream end of the second rotor blade 202.

The heat insulating portion 402 is provided between the outer circumference surface of the stator column 122 and the inner circumference surface of the first rotor blade 201, and spaced apart from the outer circumference surface of the stator column 122 and the inner circumference surface of the first rotor blade 201. The heat insulating portion 402 has a heat insulating structure having a predetermined thickness W2 in the radial direction and a predetermined length L2 in the axial direction. There is no limitation to the thickness W2, but it is preferably 1 to 15 mm, more preferably 2 to 8 mm, for example 5 mm. There is no limitation to the length L2, but it is preferably 20 to 160 mm, more preferably 50 to 120 mm, for example 80 mm. A smaller thickness W2 and a longer length L2 reduce the flow of heat into the first rotor blade 201 from the second rotor blade 202. For example, the thickness W2 may be smaller than the radial thickness of an upstream section of the second rotor blade 202. This further reduces the flow of heat into the first rotor blade 201 from the second rotor blade 202.

As described above, in the vacuum pump according to the third embodiment, the second rotor blade 202 is disposed on both the rotating shaft 113 and the first rotor blade 201 via the heat insulating portion 402. The heat insulating portion 402 thus effectively inhibits the flow of heat into the first rotor blade 201 from the second rotor blade 202. The second rotor blade 202 may be directly disposed on the rotating shaft 113 and the first rotor blade 201 only via the heat insulating portion 402. Alternatively, it may be disposed indirectly via the heat insulating portion 402 and a section or member other than the heat insulating portion 402. Furthermore, the second rotor blade 202 may be directly or indirectly disposed only on the rotating shaft 113, not on the first rotor blade 201, via the heat insulating portion 402.

The heat insulating portion 402 of the vacuum pump according to the third embodiment is a heat insulating structure having the predetermined length L2 and the thickness W2. This allows the heat insulating portion 402 of the heat insulating structure having the predetermined length L2 and the thickness W2 to effectively inhibit the flow of heat into the first rotor blade 201 from the second rotor blade 202.

Fourth Embodiment

Figure 8:
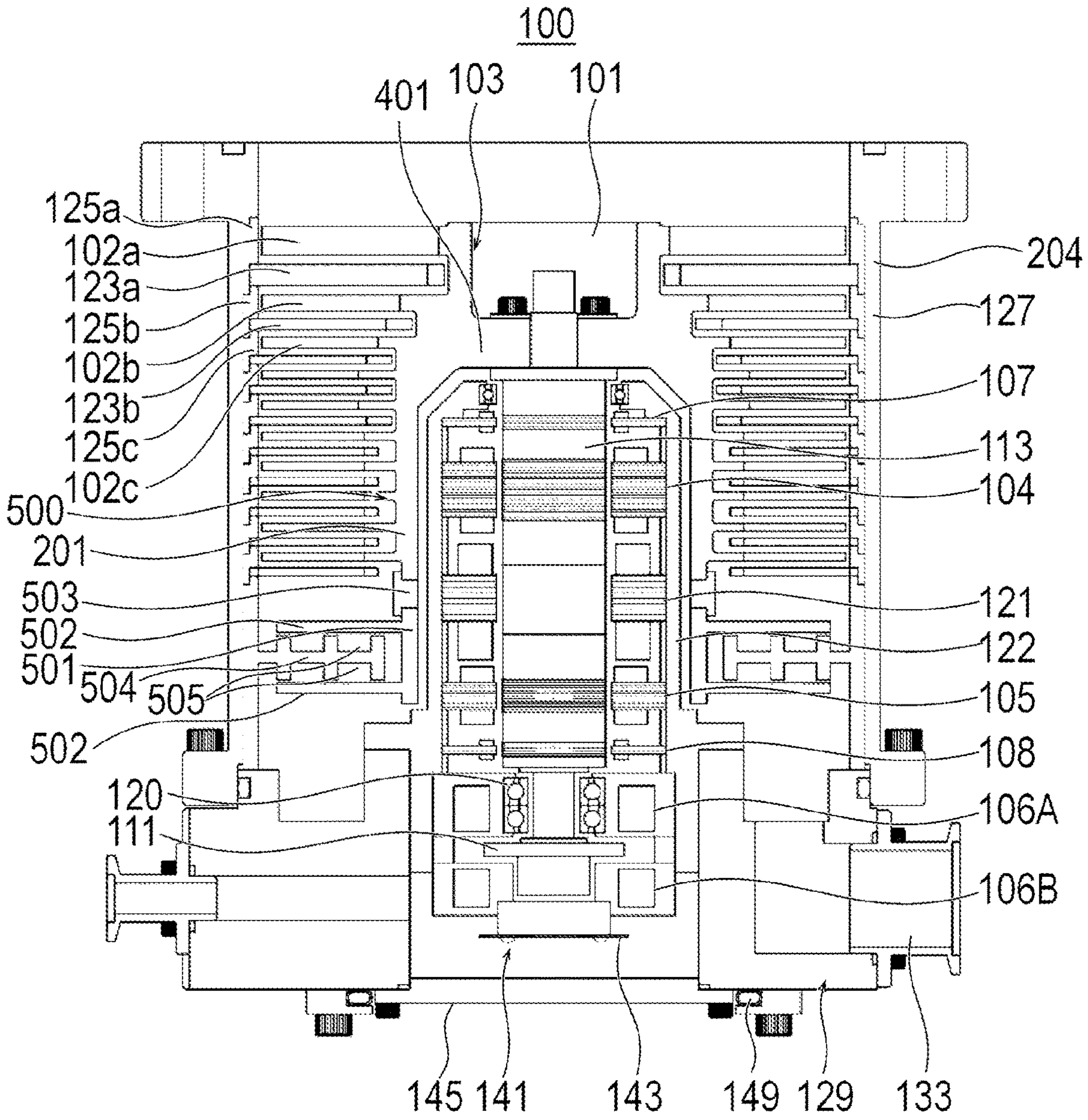
FIG. 8 is a vertical cross-sectional view of a vacuum pump according to a fourth embodiment.

As shown in FIG. 8, a vacuum pump according to a fourth embodiment differs from that of the first to third embodiments in the structure of a heat insulating portion 503 and a second rotor blade 501.

A vacuum pump rotor blade 500 of the vacuum pump according to the fourth embodiment includes a first rotor blade 201, the heat insulating portion 503, which is coupled to the downstream end of the first rotor blade 201 and the upstream end of the second rotor blade 501, and the second rotor blade 501, which includes two rotating disc portions 502 arranged in the axial direction.

The vacuum pump also includes a stationary disc portion 504 between the two rotating disc portions 502. The stationary disc portion 504 faces surfaces of the two rotating disc portions 502 that face in axial directions of the rotating disc portions 502. The two surfaces of the stationary disc portion 504 facing in axial directions (the downstream side surface and upstream side surface) include a plurality of spiral grooves 505. When exhaust gas molecules move in the rotation direction of the rotating body 103, these molecules are transferred toward the outlet port 133 in the direction of the spiral of the grooves 505.

The fourth embodiment has two rotating disc portions 502 and one stationary disc portion 504. However, there is no limitation to the numbers of the rotating disc portion 502 and the stationary disc portion 504. For example, only one rotating disc portion 502 and one stationary disc portion 504 may be provided, or two or more rotating disc portions 502 and two or more stationary disc portions 504 may be provided.

The third material forming the heat insulating portion 503 is a low thermal conductivity material having lower thermal conductivity than the first material and the second material. Thus, the heat insulating portion 503 inhibits the flow of heat into the first rotor blade 201, which is a low temperature portion, from the second rotor blade 501, which is a high temperature portion.

In the fourth embodiment, the second rotor blade 501 has at least one rotating disc portion 502 disposed on the side surface of the second rotor blade 501, and the vacuum pump includes at least one stationary disc portion 504 disposed to face a surface of the rotating disc portion 502 facing in an axial direction of the rotating disc portions 502. The rotating disc portion 502 and the stationary disc portion 504 form a Siegbahn type drag pump mechanism. This allows for effective exhaustion even when the pressure near the pump outlet port 133 is relatively high. In addition, the heat insulating portion 503 effectively inhibits the flow of heat into the first rotor blade 201 from the second rotor blade 501, allowing the Siegbahn type drag pump mechanism including the second rotor blade 501 to be maintained at a high temperature. This effectively limits the deposition of reaction products in the drag pump mechanism.

It should be noted that the present invention is not limited to the above-described embodiments, and various modifications can be made by those skilled in the art within the scope of the technical idea of the present invention. For example, the downstream high temperature portion of the vacuum pump may be formed by combining a Siegbahn type drag pump mechanism and a Holweck type drag pump mechanism. For example, a Siegbahn type drag pump mechanism may be located on the upstream side, and a Holweck type drag pump mechanism may be located on the downstream side, or vice versa. In the first to third embodiments described above, the Holweck type drag pump mechanism is formed by the outer circumference surface of the rotating cylindrical portion **102*d* and the inner circumference surface of the stationary cylindrical portion (threaded spacer 131**). However, the Holweck type drag pump mechanism may be formed by the inner circumference surface of a rotating cylindrical portion and the outer circumference surface of a stationary cylindrical portion.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump comprising:

a rotating shaft held rotationally;

a drive mechanism for the rotating shaft;

a first rotor blade made of a first material and forming a turbomolecular pump mechanism;

a second rotor blade made of a second material having higher heat resistance than the first material, and disposed further toward a downstream side than the first rotor blade, the second rotor blade forming a drag pump mechanism; and a casing enclosing the rotating shaft, the first rotor blade, and the second rotor blade, wherein the second rotor blade is disposed, via a cylindrical heat insulating portion extending in an axial direction and disposed on an inside of the first rotor blade in a radial direction, on at least one of the rotating shaft or the first rotor blade, the heat insulating portion has a smaller thickness than a thickness in the radial direction of an upstream portion of the second rotor blade, and an outermost radial position at which a portion continuously connecting from the heat insulating portion upward contacts the at least one of the rotating shaft or the first rotor blade is located radially inward from an outer circumference of the heat insulating portion.

2. The vacuum pump according to claim 1, wherein the heat insulating portion is made of a third material having lower thermal conductivity than the first material and the second material.

3. The vacuum pump according to claim 2, wherein the third material is a porous material.

4. The vacuum pump according to claim 2, wherein the third material is stainless steel or a titanium alloy.

5. The vacuum pump according to claim 2, wherein the third material is ceramic.

6. The vacuum pump according to claim 2, wherein the third material is a resin material.

7. The vacuum pump according to claim 1, wherein the first rotor blade includes blade rows of rotating blades in multiple stages disposed on a side surface of the first rotor blade, the vacuum pump includes blade rows of stationary blades disposed between the blade rows of the rotating blades, and the blade rows of the rotating blades and the blade rows of the stationary blades form the turbomolecular pump mechanism.

8. The vacuum pump according to claim 1, wherein the second rotor blade includes at least one rotating cylindrical portion disposed on the second rotor blade, the vacuum pump further comprising at least one stationary cylindrical portion disposed facing an outer circumference surface or an inner circumference surface of the rotating cylindrical portion, and the rotating cylindrical portion and the stationary cylindrical portion form the drag pump mechanism.

9. The vacuum pump according to claim 1, wherein the second rotor blade includes at least one rotating disc portion disposed on a side surface of the second rotor blade, the vacuum pump includes at least one stationary disc portion disposed facing a surface of the rotating disc portion that faces in an axial direction thereof, and the rotating disc portion and the stationary disc portion form a Siegbahn type drag pump mechanism.

10. The vacuum pump according to claim 1, wherein the first rotor blade is configured such that at least a portion thereof projects to a downstream side beyond the heat insulating portion.

11. A vacuum pump rotor blade comprising:

a first rotor blade made of a first material and forming a turbomolecular pump mechanism; and a second rotor blade made of a second material having higher heat resistance than the first material, and disposed further toward a downstream side than the first rotor blade, the second rotor blade forming a drag pump mechanism, wherein the second rotor blade is disposed, via a cylindrical heat insulating portion extending in an axial direction and disposed on an inside of the first rotor blade in a radial direction, on the first rotor blade, the heat insulating portion has a smaller thickness than a thickness in the radial direction of an upstream portion of the second rotor blade, and an outermost radial position at which a portion continuously connecting from the heat insulating portion upward contacts the at least one of the rotating shaft or the first rotor blade is located radially inward from an outer circumference of the heat insulating portion.

* * * * *